United States Patent
Kim et al.

(10) Patent No.: US 12,177,794 B2
(45) Date of Patent: Dec. 24, 2024

(54) MODIFYING TRANSMIT POWERS OF UPLINK SIGNALS ASSOCIATED WITH DIFFERENT RADIO ACCESS TECHNOLOGIES (RATs)

(71) Applicant: QUALCOMM Incorporated, San Diego, CA (US)

(72) Inventors: Sanghoon Kim, San Jose, CA (US); Brian Clarke Banister, San Diego, CA (US); Hari Sankar, San Diego, CA (US); Tom Chin, San Diego, CA (US); Wei-Jei Song, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 17/654,184

(22) Filed: Mar. 9, 2022

(65) Prior Publication Data

US 2022/0303920 A1 Sep. 22, 2022

Related U.S. Application Data

(60) Provisional application No. 63/163,653, filed on Mar. 19, 2021.

(51) Int. Cl.
*H04W 52/14* (2009.01)
*H04L 1/00* (2006.01)
(Continued)

(52) U.S. Cl.
CPC ......... *H04W 52/367* (2013.01); *H04L 1/0003* (2013.01); *H04W 52/146* (2013.01); *H04W 52/241* (2013.01); *H04W 74/0833* (2013.01)

(58) Field of Classification Search
CPC ......... H04W 72/1268; H04W 74/0841; H04W 74/0866; H04W 84/06; H04W 74/0833;
(Continued)

(56) References Cited

U.S. PATENT DOCUMENTS

| | | | |
|---|---|---|---|
| 2013/0176953 A1* | 7/2013 | Stern-Berkowitz | ............. H04W 52/365 370/329 |
| 2017/0094668 A1* | 3/2017 | Tsai | ............. H04B 7/0619 |

(Continued)

FOREIGN PATENT DOCUMENTS

| | | |
|---|---|---|
| EP | 3457769 A1 | 3/2019 |
| EP | 3790326 A1 | 3/2021 |
| WO | WO-2020252469 A1 * 12/2020 | ............ H04L 1/1812 |

OTHER PUBLICATIONS

International Search Report and Written Opinion—PCT/US2022/071068—ISA/EPO—Jul. 5, 2022.
(Continued)

*Primary Examiner* — Nathan S Taylor
(74) *Attorney, Agent, or Firm* — Harrity & Harrity, LLP/Qualcomm

(57) ABSTRACT

This disclosure provides systems, methods, and apparatuses for sharing a maximum transmit power limit between a first radio access technology (RAT) and a second RAT. In one aspect, a wireless communication apparatus may reduce the maximum transmit power limit of a first uplink signal associated with the first RAT to obtain a first transmit power. The wireless communication apparatus may allocate a second transmit power remaining from the maximum transmit power limit to a second uplink signal associated with the second RAT. The wireless communication apparatus may reduce the maximum transmit power limit when the wireless communication apparatus is located at a cell edge, and a higher priority of the first RAT in relation to the second RAT (Continued)

may otherwise result in the second transmit power of the second uplink signal not satisfying a threshold.

30 Claims, 7 Drawing Sheets

(51) Int. Cl.
*H04W 52/24* (2009.01)
*H04W 52/36* (2009.01)
*H04W 74/0833* (2024.01)

(58) Field of Classification Search
CPC ... H04W 72/12; H04W 74/08; H04W 52/146; H04W 52/241; H04W 52/367; H04W 52/243; H04W 52/262; H04W 52/283; H04W 52/34; H04W 52/346; H04W 52/38; H04W 52/40; H04W 88/10; H04W 52/14; H04W 52/24; H04W 52/36; H04W 52/26; H04W 52/28; H04W 52/42; H04L 1/0003; H04L 1/0009; H04L 1/00
See application file for complete search history.

(56) References Cited

U.S. PATENT DOCUMENTS

| | | | | |
|---|---|---|---|---|
| 2018/0077655 A1* | 3/2018 | Zhou | | H04W 52/34 |
| 2019/0132802 A1* | 5/2019 | Kusashima | | H04W 72/044 |
| 2020/0022097 A1* | 1/2020 | Wang | | H04W 52/367 |
| 2021/0144715 A1* | 5/2021 | Gotoh | | H04L 1/0004 |
| 2021/0219240 A1* | 7/2021 | Lee | | H04W 76/15 |
| 2021/0250871 A1* | 8/2021 | Rico Alvarino | | H04L 1/0009 |
| 2021/0345254 A1* | 11/2021 | Zhou | | H04W 52/367 |
| 2022/0046533 A1* | 2/2022 | Frenger | | H04W 52/0274 |
| 2022/0104099 A1* | 3/2022 | Yang | | H04L 5/0051 |
| 2023/0209467 A1* | 6/2023 | Geng | | H04W 24/02 |
| | | | | 370/318 |

OTHER PUBLICATIONS

3GPP TS 38.101-3: "3rd Generation Partnership Project, Technical Specification Group Radio Access Network, NR, User Equipment (UE) Radio Transmission and Reception, Part 3: Range 1 and Range 2 Interworking Operation with Other Radios(Release 17)", 3GPP Standard, Technical Specification, 3GPP TS 38.101-3, 3rd Generation Partnership Project, Mobile Competence Centre, 650, Route Des Lucioles, F-06921 Sophia-Antipolis Cedex, France, vol. WG4, No. V17.0.0, Jan. 12, 2021, XP051999650, pp. 1-667.

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3GPP, Mobile Competence Centre, 650, Route Des Lucioles, F-06921, Sophia-Antipolis Cedex, France, vol. Ran WG2, No. V16.3.1, Jan. 7, 2021, XP051999705, pp. 1-932, The Whole Document.

\* cited by examiner

MODIFYING TRANSMIT POWERS OF UPLINK SIGNALS ASSOCIATED WITH DIFFERENT RADIO ACCESS TECHNOLOGIES (RATs)

CROSS-REFERENCE TO RELATED APPLICATION

This Patent application claims priority to U.S. Provisional Patent Application No. 63/163,653, filed on Mar. 19, 2021, entitled "MODIFYING TRANSMIT POWERS OF UPLINK SIGNALS ASSOCIATED WITH DIFFERENT RADIO ACCESS TECHNOLOGIES (RATs)," and assigned to the assignee hereof. The disclosure of the prior Application is considered part of and is incorporated by reference into this Patent Application.

TECHNICAL FIELD

Aspects of the present disclosure relate generally to wireless communication and to techniques for modifying transmit powers of uplink signals associated with different radio access technologies (RATs).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method performed by a wireless communication apparatus. The method may include reducing a maximum transmit power limit of a first uplink signal associated with a first radio access technology (RAT) to obtain a first transmit power; allocating a second transmit power remaining from the maximum transmit power limit to a second uplink signal associated with a second RAT; transmitting, to a first base station (B S), the first uplink signal associated with the first RAT based on the first transmit power; and transmitting, to a second B S, the second uplink signal associated with the second RAT based on the second transmit power.

In some implementations, the first RAT is a Long Term Evolution RAT and the second RAT is a New Radio RAT.

In some implementations, the second uplink signal overlaps in time with the first uplink signal.

In some implementations, a total transmit power of the first uplink signal and the second uplink signal is within a tolerance level of the maximum transmit power limit.

In some implementations, the method can include receiving, from one of the first B S or the second BS, a radio resource control (RRC) configuration that indicates the maximum transmit power limit.

In some implementations, the wireless communication apparatus is located at a cell edge.

In some implementations, the method can include reducing the maximum transmit power limit based on a condition being satisfied.

In some implementations, the condition is satisfied and the maximum transmit power limit is reduced when a path loss associated with the first RAT satisfies a threshold.

In some implementations, the condition is satisfied and the maximum transmit power limit is reduced based on one or more of an uplink modulation and coding scheme (MCS) or a modulation order associated with the first RAT.

In some implementations, the condition is satisfied and the maximum transmit power limit is reduced based on a traffic type associated with the first uplink signal.

In some implementations, the condition is not satisfied and the maximum transmit power limit is not reduced when the first uplink signal is associated with a physical random access channel (PRACH) transmission.

In some implementations, the condition is not satisfied and the maximum transmit power limit is not reduced when the first uplink signal is associated with a physical uplink control channel (PUCCH) transmission.

In some implementations, the condition is not satisfied and the maximum transmit power limit is not reduced when the first uplink signal occurs within a threshold time period after a handover of the wireless communication apparatus.

In some implementations, the condition is not satisfied and the maximum transmit power limit is not reduced when the first uplink signal occurs within a threshold time period after an initial access procedure of the wireless communication apparatus.

In some implementations, the condition is satisfied and the maximum transmit power limit is reduced based on an effective signal-to-noise ratio (SNR) level at a base station associated with the first RAT satisfying a threshold.

In some implementations, the condition is satisfied and the maximum transmit power limit is reduced based on a quantity of layers associated with a spatial multiplexing capability of the wireless communication apparatus.

Another innovative aspect of the subject matter described in this disclosure can be implemented in a wireless communication apparatus. The wireless communication apparatus may include a processing system configured to reduce a maximum transmit power limit of a first uplink signal associated with a first RAT to obtain a first transmit power. The processing system may be configured to allocate a second transmit power remaining from the maximum transmit power limit to a second uplink signal associated with a second RAT. The wireless communication apparatus may include a first interface configured to output, to a first BS, the first uplink signal associated with the first RAT based on the first transmit power. The first interface may be configured to output, to a second BS, the second uplink signal associated with the second RAT based on the second transmit power.

In some implementations, the first RAT is a Long Term Evolution RAT and the second RAT is a New Radio RAT.

In some implementations, the second uplink signal overlaps in time with the first uplink signal.

In some implementations, a total transmit power of the first uplink signal and the second uplink signal is within a tolerance level of the maximum transmit power limit.

In some implementations, the first interface or a second interface may be further configured to obtain, from one of the first BS or the second BS, an RRC configuration that indicates the maximum transmit power limit.

In some implementations, the wireless communication apparatus is located at a cell edge.

In some implementations, the processing system, to reduce the first transmit power, may be configured to reduce the maximum transmit power limit based on a condition being satisfied.

In some implementations, the condition is satisfied and the maximum transmit power limit is reduced when a path loss associated with the first RAT satisfies a threshold.

In some implementations, the condition is satisfied and the maximum transmit power limit is reduced based on one or more of an uplink MCS or a modulation order associated with the first RAT.

In some implementations, the condition is satisfied and the maximum transmit power limit is reduced based on a traffic type associated with the first uplink signal.

In some implementations, the condition is not satisfied and the maximum transmit power limit is not reduced when the first uplink signal is associated with a PRACH transmission.

In some implementations, the condition is not satisfied and the maximum transmit power limit is not reduced when the first uplink signal is associated with a PUCCH transmission.

In some implementations, the condition is not satisfied and the maximum transmit power limit is not reduced when the first uplink signal occurs within a threshold time period after a handover of the wireless communication apparatus.

In some implementations, the condition is not satisfied and the maximum transmit power limit is not reduced when the first uplink signal occurs within a threshold time period after an initial access procedure of the wireless communication apparatus.

In some implementations, the condition is satisfied and the maximum transmit power limit is reduced based on an effective SNR level at a base station associated with the first RAT satisfying a threshold.

In some implementations, the condition is satisfied and the maximum transmit power limit is reduced based on a quantity of layers associated with a spatial multiplexing capability of the wireless communication apparatus.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless communication apparatus, may cause the one or more processors to reduce a maximum transmit power limit of a first uplink signal associated with a first RAT to obtain a first transmit power; allocate a second transmit power remaining from the maximum transmit power limit to a second uplink signal associated with a second RAT; transmit, to a first BS, the first uplink signal associated with the first RAT based on the first transmit power; and transmit, to a second BS, the second uplink signal associated with the second RAT based on the second transmit power.

In some implementations, the first RAT is a Long Term Evolution RAT and the second RAT is a New Radio RAT.

In some implementations, the second uplink signal overlaps in time with the first uplink signal.

In some implementations, a total transmit power of the first uplink signal and the second uplink signal is within a tolerance level of the maximum transmit power limit.

In some implementations, the one or more instructions further cause the wireless communication apparatus to receive, from one of the first BS or the second BS, an RRC configuration that indicates the maximum transmit power limit.

In some implementations, the wireless communication apparatus is located at a cell edge.

In some implementations, the one or more instructions, that cause the wireless communication apparatus to reduce the first transmit power, cause the wireless communication apparatus to reduce the maximum transmit power limit based on a condition being satisfied.

In some implementations, the condition is satisfied and the maximum transmit power limit is reduced when a path loss associated with the first RAT satisfies a threshold.

In some implementations, the condition is satisfied and the maximum transmit power limit is reduced based on one or more of an uplink MCS or a modulation order associated with the first RAT.

In some implementations, the condition is satisfied and the maximum transmit power limit is reduced based on a traffic type associated with the first uplink signal.

In some implementations, the condition is not satisfied and the maximum transmit power limit is not reduced when the first uplink signal is associated with a PRACH transmission.

In some implementations, the condition is not satisfied and the maximum transmit power limit is not reduced when the first uplink signal is associated with a PUCCH transmission.

In some implementations, the condition is not satisfied and the maximum transmit power limit is not reduced when the first uplink signal occurs within a threshold time period after a handover of the wireless communication apparatus.

In some implementations, the condition is not satisfied and the maximum transmit power limit is not reduced when the first uplink signal occurs within a threshold time period after an initial access procedure of the wireless communication apparatus.

In some implementations, the condition is satisfied and the maximum transmit power limit is reduced based on an effective SNR level at a base station associated with the first RAT satisfying a threshold.

In some implementations, the condition is satisfied and the maximum transmit power limit is reduced based on a quantity of layers associated with a spatial multiplexing capability of the wireless communication apparatus.

Another innovative aspect of the subject matter described in this disclosure can be implemented in a wireless communication apparatus. The wireless communication apparatus may include means for reducing a maximum transmit power limit of a first uplink signal associated with a first RAT to obtain a first transmit power; means for allocating a second transmit power remaining from the maximum transmit power limit to a second uplink signal associated with a second RAT; means for transmitting, to a first BS, the first uplink signal associated with the first RAT based on the first transmit power; and means for transmitting, to a second BS, the second uplink signal associated with the second RAT based on the second transmit power.

In some implementations, the first RAT is a Long Term Evolution RAT and the second RAT is a New Radio RAT.

In some implementations, the second uplink signal overlaps in time with the first uplink signal.

In some implementations, a total transmit power of the first uplink signal and the second uplink signal is within a tolerance level of the maximum transmit power limit.

In some implementations, the wireless communication apparatus may further include means for receiving, from one of the first BS or the second BS, an RRC configuration that indicates the maximum transmit power limit.

In some implementations, the wireless communication apparatus is located at a cell edge.

In some implementations, the wireless communication apparatus may include means for reducing the maximum transmit power limit based on a condition being satisfied.

In some implementations, the condition is satisfied and the maximum transmit power limit is reduced when a path loss associated with the first RAT satisfies a threshold.

In some implementations, the condition is satisfied and the maximum transmit power limit is reduced based on one or more of an uplink MCS or a modulation order associated with the first RAT.

In some implementations, the condition is satisfied and the maximum transmit power limit is reduced based on a traffic type associated with the first uplink signal.

In some implementations, the condition is not satisfied and the maximum transmit power limit is not reduced when the first uplink signal is associated with a PRACH transmission.

In some implementations, the condition is not satisfied and the maximum transmit power limit is not reduced when the first uplink signal is associated with a PUCCH transmission.

In some implementations, the condition is not satisfied and the maximum transmit power limit is not reduced when the first uplink signal occurs within a threshold time period after a handover of the wireless communication apparatus.

In some implementations, the condition is not satisfied and the maximum transmit power limit is not reduced when the first uplink signal occurs within a threshold time period after an initial access procedure of the wireless communication apparatus.

In some implementations, the condition is satisfied and the maximum transmit power limit is reduced based on an effective SNR level at a base station associated with the first RAT satisfying a threshold.

In some implementations, the condition is satisfied and the maximum transmit power limit is reduced based on a quantity of layers associated with a spatial multiplexing capability of the wireless communication apparatus.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
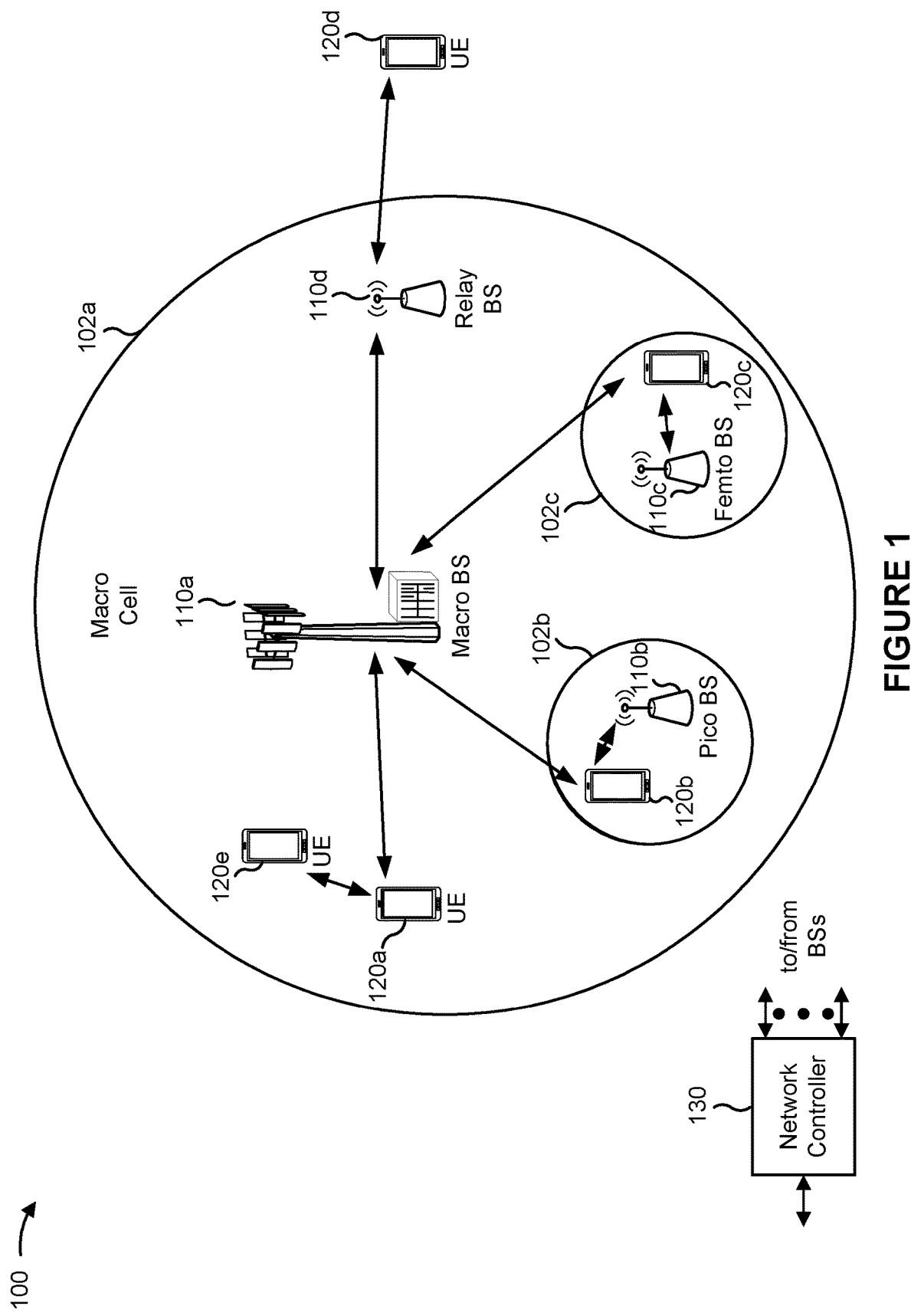
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (TOT) network, such as a system utilizing 3G technology, 4G technology, 5G technology, or further implementations thereof.

An Evolved Universal Terrestrial Radio Access-New Radio (E-UTRA-NR) Dual Connectivity (EN-DC) wireless communication apparatus may be connected to a first network entity (for example, a first base station (BS) associated with a first radio access technology (RAT), such as E-UTRA or LTE. The EN DC wireless communication apparatus may attempt to connect to a second BS associated with a second RAT, such as NR, after LTE is established. After the first and second RATs are connected, the UE may perform simultaneous transmissions in an uplink using both LTE and NR. An NR uplink performance may be impacted by an LTE uplink power usage. For example, between LTE and NR, LTE may have a priority on power usage over NR. As a result, LTE may initially consume an available transmit power, and a remaining transmit power may be available to NR. In other words, LTE may have access to full transmit power, and the remaining transmit power may be made available to NR.

A maximum combined transmit power between LTE and NR may be configured by a radio resource control (RRC) configuration. For example, the RRC configuration may define an EN-DC maximum power value (for example, p-MaxEUTRA) to indicate the maximum combined transmit power between LTE and NR.

Power distribution between LTE and NR may be based on a dynamic power sharing approach or a time division duplex (TDM) pattern approach. In the dynamic power sharing approach, when LTE and NR scheduling overlap and a total power exceeds the EN-DC maximum power value (for example, p-MaxEUTRA, as indicated in the RRC configuration), an NR transmit power may be backed off to allow LTE to use full uplink power. An LTE transmit power may not be subject to backoff. In the TDM pattern approach, LTE and NR scheduling may not overlap, so the NR transmit power may not be backed off to allow LTE to use full uplink power.

As an example, for LTE, a maximum transmit power limit may be 23 decibel-milliwatts (dBm). Since LTE has a higher priority than NR, LTE may be allowed a full maximum transmit power of 23 dBm. However, at a cell edge, when LTE is allowed the full maximum transmit power of 23 dBm, NR may be allowed a minimum transmit power or no transmit power, since LTE has priority over NR and may consume most or all of the maximum transmit power limit.

In a more specific example, in a cell edge scenario, LTE may request a transmit power of approximately 36-41 dBm. LTE may be allocated the maximum transmit power limit of 23 dBm. In other words, an actual transmit power for LTE may be 23 dBm. Further, NR may request a transmit power of approximately 33-44 dBm. However, since LTE has the higher priority and is allocated the maximum transmit power limit, NR may be allocated the minimum transmit power or no transmit power in the cell edge scenario. For example, NR may be allocated with no transmit power because LTE may consume the available power. As a result, an NR performance may be negatively affected by the LTE uplink power usage in the cell edge scenario.

Figure 2:
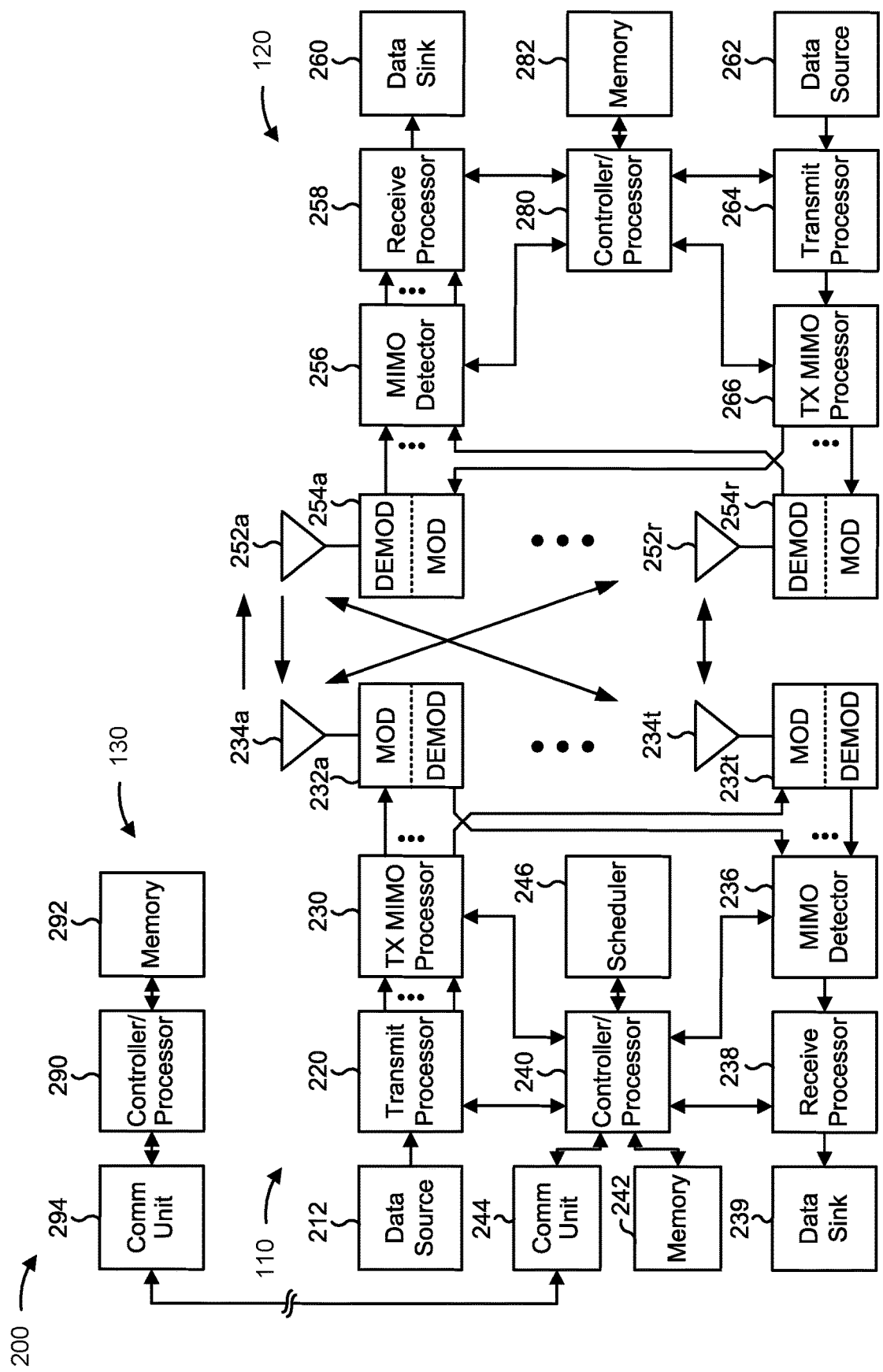
FIG. 2 is a diagram illustrating an example of a base station (BS) in communication with a user equipment (UE) in a wireless network.

In various aspects of techniques and apparatuses described herein, a wireless communication apparatus (for example, a user equipment (UE), such as UE 120 depicted in FIGS. 1 and 2) may reduce a maximum transmit power limit of a first uplink signal associated with LTE (for example, a first radio access technology (RAT)) to obtain a first transmit power. The wireless communication apparatus may allocate a second transmit power remaining from the maximum transmit power limit to a second uplink signal associated with NR (for example, a second RAT). The wireless communication apparatus may transmit, to a first BS, the first uplink signal associated with LTE based on the first transmit power. The wireless communication apparatus may transmit, to a second BS, the second uplink signal associated with NR based on the second transmit power. In some aspects, a total transmit power of the first uplink signal and the second uplink signal may be within a tolerance level of the maximum transmit power limit. As a result, the total transmit power may be in compliance with the maximum transmit power limit associated with the wireless communication apparatus.

Particular implementations of the subject matter described in this disclosure can be implemented to realize one or more of the following potential advantages. For example, in a cell edge scenario in which a transmit power associated with an NR signal is relatively weak, a maximum transmit power limit (for example, 23 dBm) of an uplink signal associated with LTE may be reduced so that the NR signal may be provided with additional transmit power. In some implementations, the additional transmit power may provide meaningful transmit power to maintain the NR uplink. In other words, the maximum transmit power limit may be shared between LTE and NR, even though LTE has a higher priority than NR, and as a result of the higher priority of NR as compared to LTE, LTE may not be subjected to LTE power backoff. Without such a mechanism, the transmit power for NR may be substantially degraded since an LTE signal of higher priority may be allocated a majority of the maximum transmit power limit. Such degradation may jeopardize the NR uplink link quality, or result in the NR signal being dropped altogether. The sharing of the maximum transmit power limit between LTE and NR may have a relatively small impact on the LTE signal, but may have a relatively large improvement on the NR signal. As a result, an overall throughput may be improved for both LTE and NR during the cell edge scenario. Further, an NR range may be extended by sharing the maximum transmit power limit between LTE and NR, thereby expanding an NR coverage with a relatively small impact on LTE.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network entities, such as one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), or other network entities. A base station 110 is an example of a network entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells.

In some aspects, the term "base station" (for example, base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

FIG. 2 is a diagram illustrating an example 200 of a base station 110 in communication with a UE 120 in a wireless network 100. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, "processing system" of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, "first interface" may refer to an interface between the processing system of the chip or modem and a receiver, such that the UE 120 may receive information or signal inputs, and the information may be passed to the processing system. In some cases, "second interface" may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with modifying transmit powers of uplink signals associated with different RATs, as described in more detail elsewhere herein. For example, the controller/processor 240 of the base station 110, the controller/processor 280 of the UE 120, or any other component(s) (or combinations of components) of FIG. 2 may perform or direct operations of, for example, process 700 of FIG. 7, or other processes as described herein. The memory 242 and the memory 282 may store data and program codes for the base station 110 and the UE 120, respectively. In some aspects, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, or other processes as described herein.

In some aspects, a wireless communication apparatus (for example, UE 120) includes means for reducing a maximum transmit power limit of a first uplink signal associated with a first RAT to obtain a first transmit power; means for allocating a second transmit power remaining from the maximum transmit power limit to a second uplink signal associated with a second RAT; means for transmitting, to a first BS, the first uplink signal associated with the first RAT based on the first transmit power; and means for transmitting, to a second BS, the second uplink signal associated with the second RAT based on the second transmit power. In some aspects, the means for the wireless communication apparatus to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
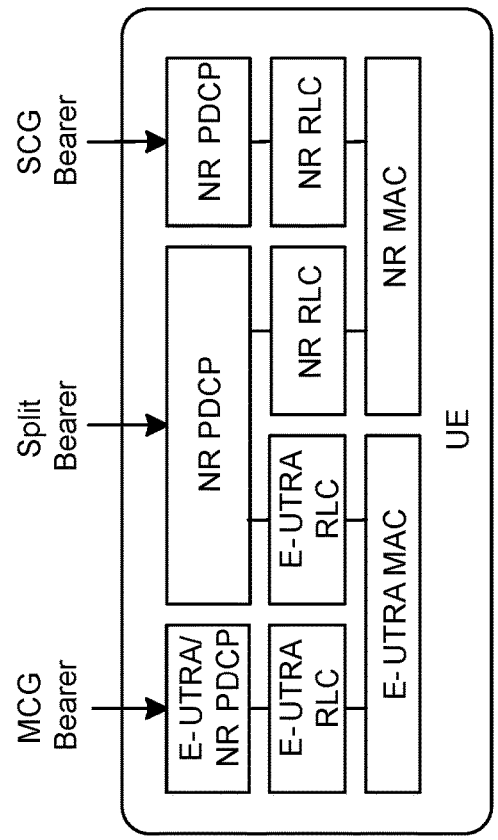
FIG. 3 is a diagram illustrating an example of a radio protocol architecture associated with a wireless communication apparatus.

FIG. 3 is a diagram illustrating an example 300 of a radio protocol architecture associated with a wireless communication apparatus.

As shown in FIG. 3, a radio protocol architecture for a master cell group (MCG) bearer, a secondary cell group (SCG) bearer, and a split bearer may be defined for a wireless communication apparatus (for example, a UE) in Multi-Radio Dual Connectivity (MR-DC) with Evolved Universal Terrestrial Radio Access-New Radio (E-UTRA-NR) Dual Connectivity (EN-DC). The split bearer may be associated with an NR packet data convergence protocol (PDCP) layer, an E-UTRA radio link control (RLC) layer, and an NR RLC layer. The MCG bearer may be associated with an E-UTRA/NR PDCP layer, an E-UTRA RLC layer, and an E-UTRA medium access control (MAC) layer. The SCG bearer may be associated with an NR PDCP layer, an NR RLC layer, and an NR MAC layer.

A path associated with the E-UTRA RLC layer or the E-UTRA MAC layer may correspond to an LTE path or an E-UTRA path. A path associated with the NR RLC layer or the NR MAC layer may correspond to an NR path.

The wireless communication apparatus may communicate with a first BS associated with an MCG based on the MCG bearer. The first BS may be associated with a first RAT (for example, E-UTRA or LTE). The wireless communication apparatus also may communicate with a second BS associated with an SCG based on the SCG bearer. The second BS may be associated with a second RAT (for example, NR).

Figure 4:
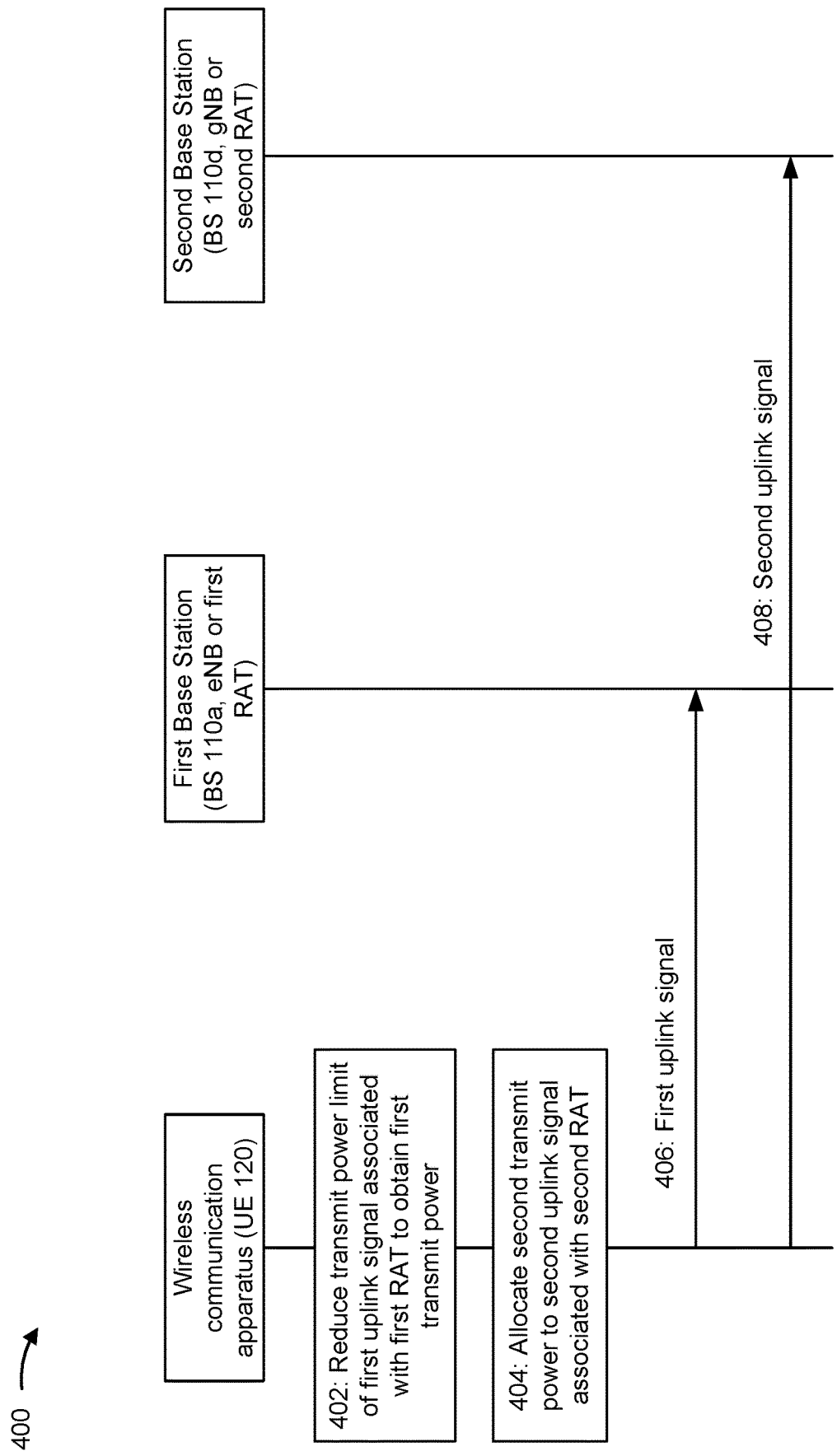
FIGS. 4 and 5 are diagrams illustrating examples associated with modifying transmit powers of uplink signals associated with different radio access technologies (RATs).

FIG. 4 is a diagram illustrating an example 400 associated with modifying transmit powers of uplink signals associated with different RATs. As shown in FIG. 4, example 400 includes communication between a wireless communication apparatus (for example, UE 120), a first base station (for example, base station 110*a* or an eNB), and a second base station (for example, base station 110*d* or a gNB). In some aspects, the wireless communication apparatus, the first base station, and the second base station may be included in a wireless network such as wireless network 100.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (for example, base station 110), or one or more units (or one or more components) performing base station functionality, may be implemented in an aggregated or disaggregated architecture. For example, a BS (such as a Node B (NB), eNB, NR BS, 5G NB, gNodeB (gNB), access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As shown by reference number 402, the wireless communication apparatus may reduce a maximum transmit power limit of a first uplink signal associated with LTE (for example, a first RAT) to obtain a first transmit power. The wireless communication apparatus may reduce the maximum transmit power limit of the first uplink signal so that a sufficient transmit power may be available for a second uplink signal associated with NR (for example, a second RAT). The wireless communication apparatus may reduce the maximum transmit power limit of the first uplink signal based on the wireless communication apparatus being located at a cell edge, at which the second uplink signal associated with NR is more likely to be poor as compared to when the wireless communication apparatus is located at a cell center.

In some aspects, the wireless communication apparatus may receive, from the first BS, an RRC configuration that indicates the maximum transmit power limit. In other words, the wireless communication apparatus may reduce the maximum transmit power limit based on the RRC configuration that indicates the maximum transmit power limit.

As shown by reference number 404, the wireless communication apparatus may allocate a second transmit power remaining from the maximum transmit power limit to the second uplink signal associated with NR (for example, the second RAT). In some aspects, the first transmit power may be within a threshold amount of the second transmit power. In other words, the first transmit power may be substantially equal to the second transmit power. Alternatively, the first transmit power may be more than the second transmit power, since LTE associated with the first transmit power may have a higher priority than NR associated with the second transmit power.

In some aspects, the wireless communication apparatus may reduce the maximum transmit power limit such that a total transmit power of the first uplink signal and the second uplink signal is within a tolerance level of the maximum transmit power limit. In other words, the wireless communication apparatus may reduce the maximum transmit power limit by a quantity that does not cause the total transmit power to be outside the tolerance level of the maximum transmit power limit.

As an example, in a cell edge scenario, without reducing the maximum transmit power limit of the LTE signal, a transmit power of the LTE signal may be 23 dBm and no transmit power may be allocated for the NR signal. As a result, the NR signal may be susceptible to radio link failure (RLF) or dropped after a period of time since the NR signal may have lower priority than the LTE signal. However, when reducing the maximum transmit power limit of the LTE signal, the transmit power of the LTE signal may be 21.5 dBm and the transmit power of the NR signal may be 21.5 dBm instead of −35 dBm if power sharing is not practiced. In other words, a relatively small power backoff of 1.5 dBm to the LTE signal may have a significant effect on the NR signal. Although the transmit power of the LTE signal is slightly reduced, the benefit to the transmit power of the NR signal may outweigh the loss in transmit power to the LTE signal.

Further, a total transmit power for both LTE and NR may be 24.5 dBm. The 24.5 dBm may be within the ±2 dBm tolerance level of the maximum transmit power limit of 23 dBm. In other words, the total transmit power of 24.5 dBm may be in compliance with the maximum transmit power limit since the maximum transmit power limit is subject to the ±2 dBm tolerance level. As a result, a transmit power tolerance may be utilized for an overall throughput improvement and an NR coverage enhancement.

In some aspects, the wireless communication apparatus may reduce the maximum transmit power limit based on a condition being satisfied. In other words, when the condition is satisfied, the wireless communication apparatus may reduce the maximum transmit power limit. However, when the condition is not satisfied, the wireless communication apparatus may not reduce the maximum transmit power limit.

In some aspects, an impact to an LTE performance may be minimized since the maximum transmit power limit may be reduced only when the condition is satisfied. For EN-DC, RRC traffic may flow through LTE and maintaining LTE connectivity may be needed for NR connectivity. As a result, conditions may be defined to reduce an LTE impact resulting from lowering the maximum transmit power limit for LTE.

In some aspects, the wireless communication apparatus may determine that the condition is satisfied and may reduce the maximum transmit power limit when a path loss associated with LTE satisfies a threshold. For example, when the pathloss associated with LTE is less than a certain threshold, the wireless communication apparatus may backoff the maximum transmit power limit for the first uplink signal (for example, the LTE signal). On the other hand, when the pathloss associated with LTE is over the certain threshold, the wireless communication apparatus may not backoff the maximum transmit power limit for the first uplink signal.

In some aspects, the wireless communication apparatus may determine that the condition is satisfied and may reduce the maximum transmit power limit based on an uplink MCS or a modulation order associated with LTE. For example, when the uplink MCS associated with LTE is a relatively lower modulation order or a certain MCS, the wireless communication apparatus may backoff the maximum transmit power limit for the first uplink signal (for example, the LTE signal). On the other hand, when the uplink MCS associated with LTE is a relatively higher modulation order or a certain MCS, the wireless communication apparatus may not backoff the maximum transmit power limit for the first uplink signal. In some aspects, the wireless communication apparatus may or may not backoff the maximum transmit power limit depending on the modulation order, which may be pi/2 (or π/2) binary phase-shift keying (BPSK), quadrature phase-shift keying (QPSK), 16 quadrature amplitude modulation (16QAM), 64 quadrature amplitude modulation (64QAM), or 256 quadrature amplitude modulation (256QAM).

In some aspects, the wireless communication apparatus may determine that the condition is satisfied and may reduce the maximum transmit power limit based on a traffic type associated with first uplink signal. For example, the wireless communication apparatus may backoff the maximum transmit power limit for LTE traffic. However, the wireless communication apparatus may determine that the condition is not satisfied and may not reduce the maximum transmit power limit when the first uplink signal is associated with a PRACH transmission or a PUCCH transmission. Further, the wireless communication apparatus may determine that the condition is not satisfied and may not reduce the maximum transmit power limit when the first uplink signal occurs within a threshold time period after a handover or an initial access procedure of the wireless communication apparatus.

In some aspects, the wireless communication apparatus may determine that the condition is satisfied and may reduce the maximum transmit power limit based on an effective SNR level associated with LTE satisfying a threshold. For example, when the effective SNR level exceeds the threshold, the maximum transmit power limit may be reduced, but when the effective SNR level is less than the threshold, the maximum transmit power limit may not be reduced. Further, the wireless communication apparatus may determine that the condition is satisfied and may reduce the maximum transmit power limit based on a quantity of layers associated with a spatial multiplexing capability of the wireless communication apparatus. For example, the maximum transmit power limit may be reduced when the quantity of layers is equal to one (1), but the maximum transmit power limit may not be reduced when the quantity of layers is greater than one.

In some aspects, the wireless communication apparatus may determine whether to reduce the maximum transmit power limit (for example, subject the LTE power to a power backoff) based on a pathloss, an MCS, a modulation order, a traffic type (for example, PRACH transmission or PUCCH transmission), an effective SNR, or a number of layers. As a result, an impact on LTE performance may be minimized due to less power being allocated to LTE.

As shown by reference number 406, the wireless communication apparatus may transmit, to the first BS, the first uplink signal associated with LTE based on the first transmit power. The first transmit power may be less than the maximum transmit power limit.

As shown by reference number 408, the wireless communication apparatus may transmit, to the second BS, the second uplink signal associated with NR based on the second transmit power. The second transmit power may be equal to or less than the first transmit power. Further, the second uplink signal may overlap in time with the first uplink signal.

Figure 5:
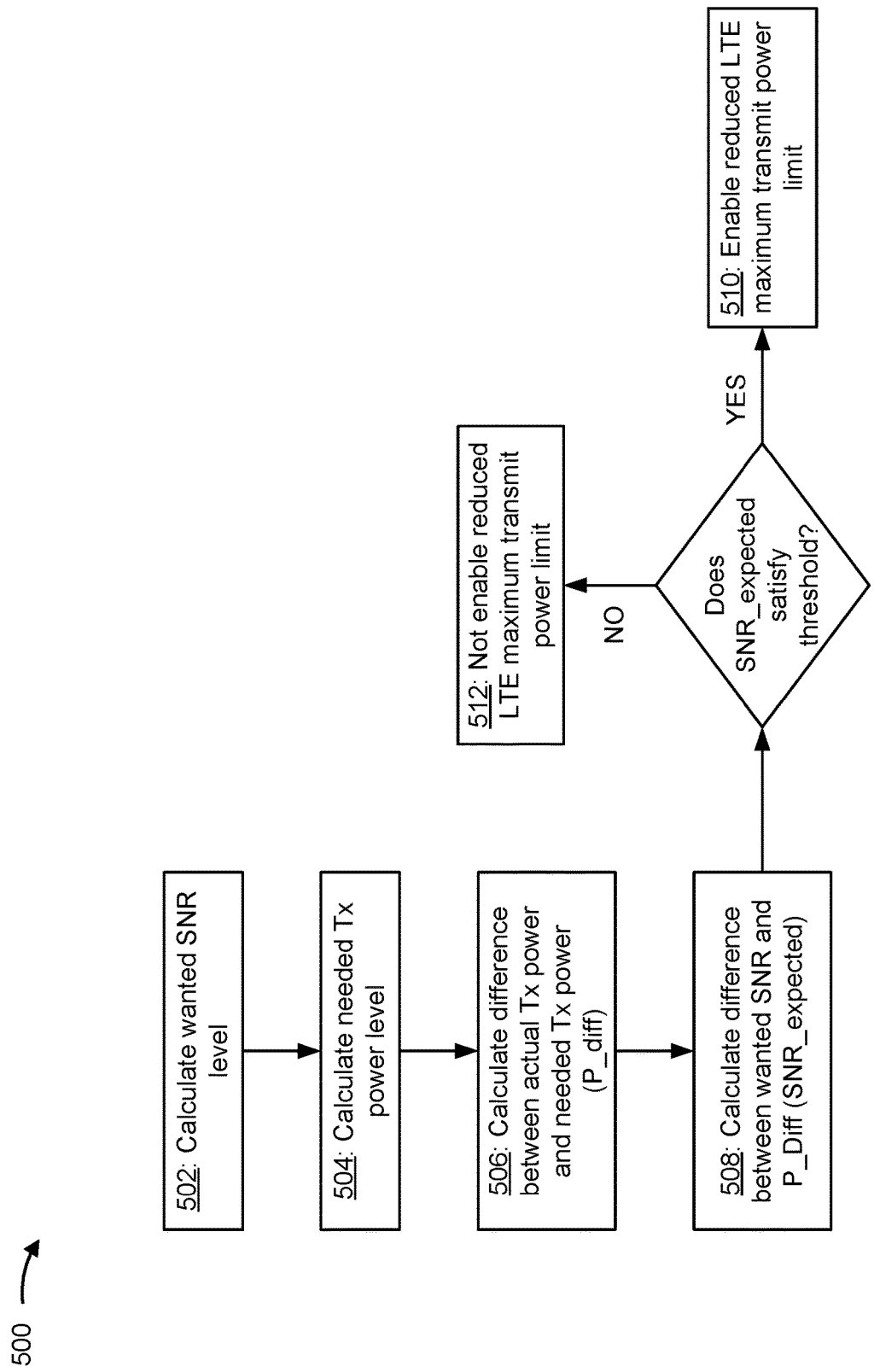

FIG. 5 is a diagram illustrating an example 500 associated with modifying transmit powers of uplink signals associated with different RATs.

As shown by reference number 502, a wireless communication apparatus (such as the wireless communication apparatus described in connection with FIG. 4) may calculate a wanted SNR level (for example, SNR_wanted) per resource block (RB). The wanted SNR level may be based on a per RB power and may be based on a 15 kHz subcarrier spacing (SCS). The wanted SNR level may be based on a noise power and a nominal power. As an example, the wanted SNR level may be 35 to 44 dB. Thus, the wanted SNR level may be a minimum level of downlink SNR needed by the wireless communication apparatus.

As shown by reference number 504, the wireless communication apparatus may calculate a needed transmit power level (for example, P needed) to satisfy the wanted SNR level. The wireless communication apparatus may calculate the needed transmit power level based on an LTE transmit power computation, while correcting for some factors such as an alpha value or a transmit power control.

As shown by reference number 506, the wireless communication apparatus may calculate a difference (P-diff) between an actual transmit power and the needed transmit power.

As shown by reference number 508, the wireless communication apparatus may calculate a difference between P-diff and the wanted SNR level. In other words, an expected SNR (SNR_expected) may be calculated based on a difference between the wanted SNR level (SNR_wanted) and the difference between the actual transmit power and the needed transmit power (P-diff).

As shown by reference number 510, when the expected SNR satisfies a threshold (for example, SNR threshold), the wireless communication apparatus may enable a reduced (or revised) LTE maximum transmit power limit. For example, when the expected SNR is greater than or equal to the threshold and a modulation order is QPSK, the wireless communication apparatus may enable the reduced LTE maximum transmit power limit.

As shown by reference number 512, when the expected SNR does not satisfy a threshold (for example, SNR threshold), the wireless communication apparatus may not enable the reduced LTE maximum transmit power limit. For example, when the expected SNR is less than the threshold and a modulation order is not QPSK, the wireless communication apparatus may not enable the reduced LTE maximum transmit power limit.

Figure 6:
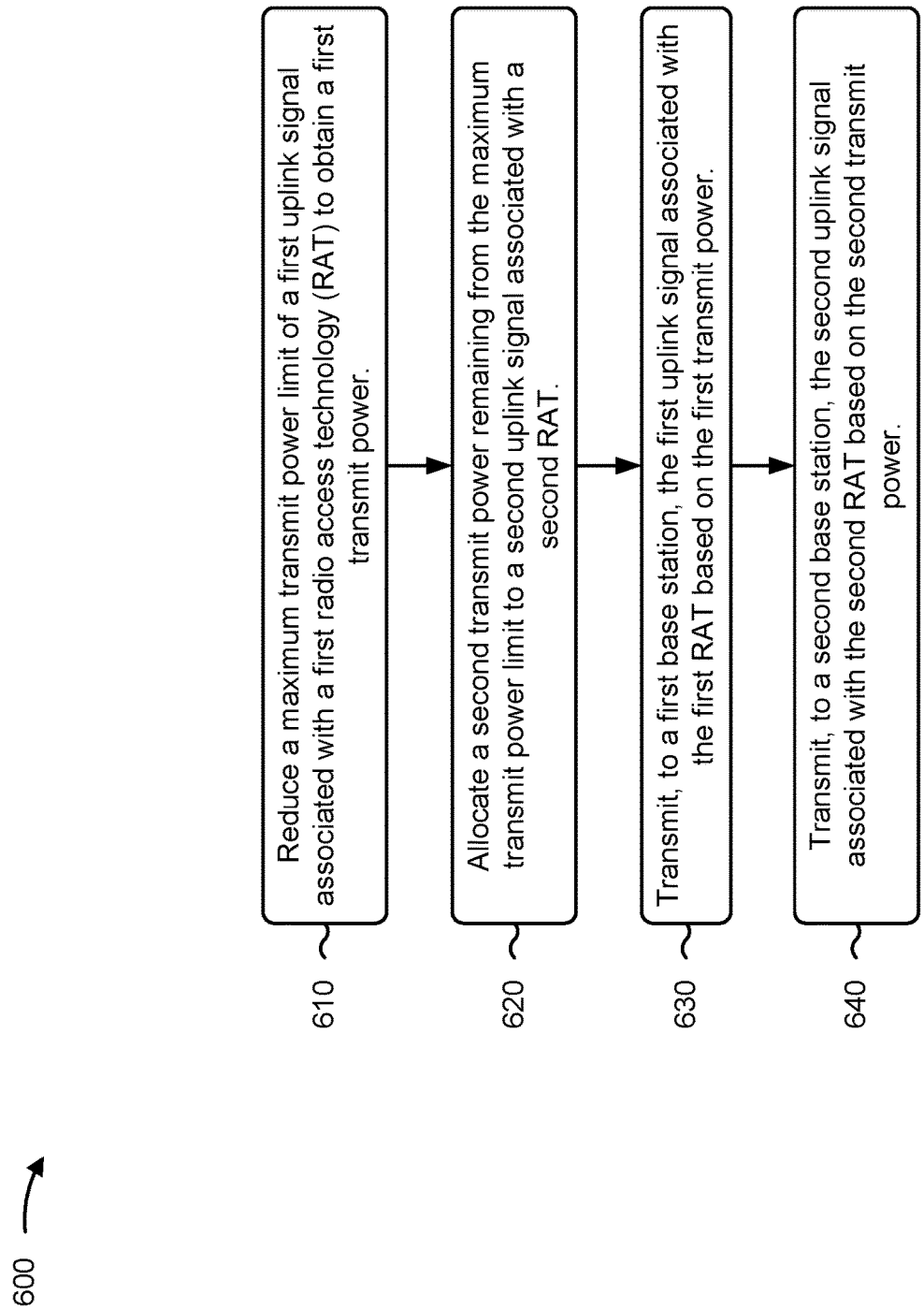
FIG. 6 is a diagram illustrating an example process associated with modifying transmit powers of uplink signals associated with different RATs.

FIG. 6 is a diagram illustrating an example process 600 performed, for example, by a wireless communication apparatus. The process 600 is an example where the wireless communication apparatus (for example, UE 120) performs operations associated with modifying transmit powers of uplink signals associated with different RATs.

As shown in FIG. 6, in some aspects, the process 600 may include reducing a maximum transmit power limit of a first uplink signal associated with a first RAT to obtain a first transmit power (block 610). For example, the wireless communication apparatus (such as by using reduction component 708, depicted in FIG. 7) may reduce a maximum transmit power limit of a first uplink signal associated with a first RAT to obtain a first transmit power, as described above.

As further shown in FIG. 6, in some aspects, the process 600 may include allocating a second transmit power remaining from the maximum transmit power limit to a second uplink signal associated with a second RAT (block 620). For example, the wireless communication apparatus (such as by using allocation component 710, depicted in FIG. 7) may allocate a second transmit power remaining from the maximum transmit power limit to a second uplink signal associated with a second RAT, as described above.

As further shown in FIG. 6, in some aspects, the process 600 may include transmitting, to a first BS, the first uplink signal associated with the first RAT based on the first transmit power (block 630). For example, the wireless communication apparatus (such as by using transmission component 704, depicted in FIG. 7) may transmit, to a first BS, the first uplink signal associated with the first RAT based on the first transmit power, as described above.

As further shown in FIG. 6, in some aspects, the process 600 may include transmitting, to a second BS, the second uplink signal associated with the second RAT based on the second transmit power (block 640). For example, the wireless communication apparatus (such as by using transmission component 704, depicted in FIG. 7) may transmit, to a second BS, the second uplink signal associated with the second RAT based on the second transmit power, as described above.

The process 600 may include additional aspects, such as any single aspect or any combination of aspects described below or in connection with one or more other processes described elsewhere herein.

In a first additional aspect, the first RAT is a Long Term Evolution RAT and the second RAT is a New Radio RAT.

In a second additional aspect, alone or in combination with the first aspect, the second uplink signal overlaps in time with the first uplink signal.

In a third additional aspect, alone or in combination with one or more of the first and second aspects, a total transmit power of the first uplink signal and the second uplink signal is within a tolerance level of the maximum transmit power.

In a fourth additional aspect, alone or in combination with one or more of the first through third aspects, the process 600 includes receiving, from one of the first BS or the second BS, an RRC configuration that indicates the maximum transmit power limit.

In a fifth additional aspect, alone or in combination with one or more of the first through fourth aspects, the wireless communication apparatus is located at a cell edge.

In a sixth additional aspect, alone or in combination with one or more of the first through fifth aspects, the process 600 includes reducing the maximum transmit power limit based on a condition being satisfied.

In a seventh additional aspect, alone or in combination with one or more of the first through sixth aspects, the condition is satisfied and the maximum transmit power limit is reduced when a path loss associated with the first RAT satisfies a threshold.

In an eighth additional aspect, alone or in combination with one or more of the first through seventh aspects, the condition is satisfied and the maximum transmit power limit is reduced based on one or more of an uplink MCS or a modulation order associated with the first RAT.

In a nineth additional aspect, alone or in combination with one or more of the first through eighth aspects, the condition is satisfied and the maximum transmit power limit is reduced based on a traffic type associated with the first uplink signal.

In a tenth additional aspect, alone or in combination with one or more of the first through ninth aspects, the condition is not satisfied and the maximum transmit power limit is not reduced when the first uplink signal is associated with a PRACH transmission.

In an eleventh additional aspect, alone or in combination with one or more of the first through tenth aspects, the condition is not satisfied and the maximum transmit power limit is not reduced when the first uplink signal is associated with a PUCCH transmission.

In a twelfth additional aspect, alone or in combination with one or more of the first through eleventh aspects, the condition is not satisfied and the maximum transmit power limit is not reduced when the first uplink signal occurs within a threshold time period after a handover of the wireless communication apparatus.

In a thirteenth additional aspect, alone or in combination with one or more of the first through twelfth aspects, the condition is not satisfied and the maximum transmit power limit is not reduced when the first uplink signal occurs within a threshold time period after an initial access procedure of the wireless communication apparatus.

In a fourteenth additional aspect, alone or in combination with one or more of the first through thirteenth aspects, the condition is satisfied and the maximum transmit power limit is reduced based on an effective SNR level at a base station associated with the first RAT satisfying a threshold.

In a fifteenth additional aspect, alone or in combination with one or more of the first through fourteenth aspects, the condition is satisfied and the maximum transmit power limit is reduced based on a quantity of layers associated with a spatial multiplexing capability of the wireless communication apparatus.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

Figure 7:
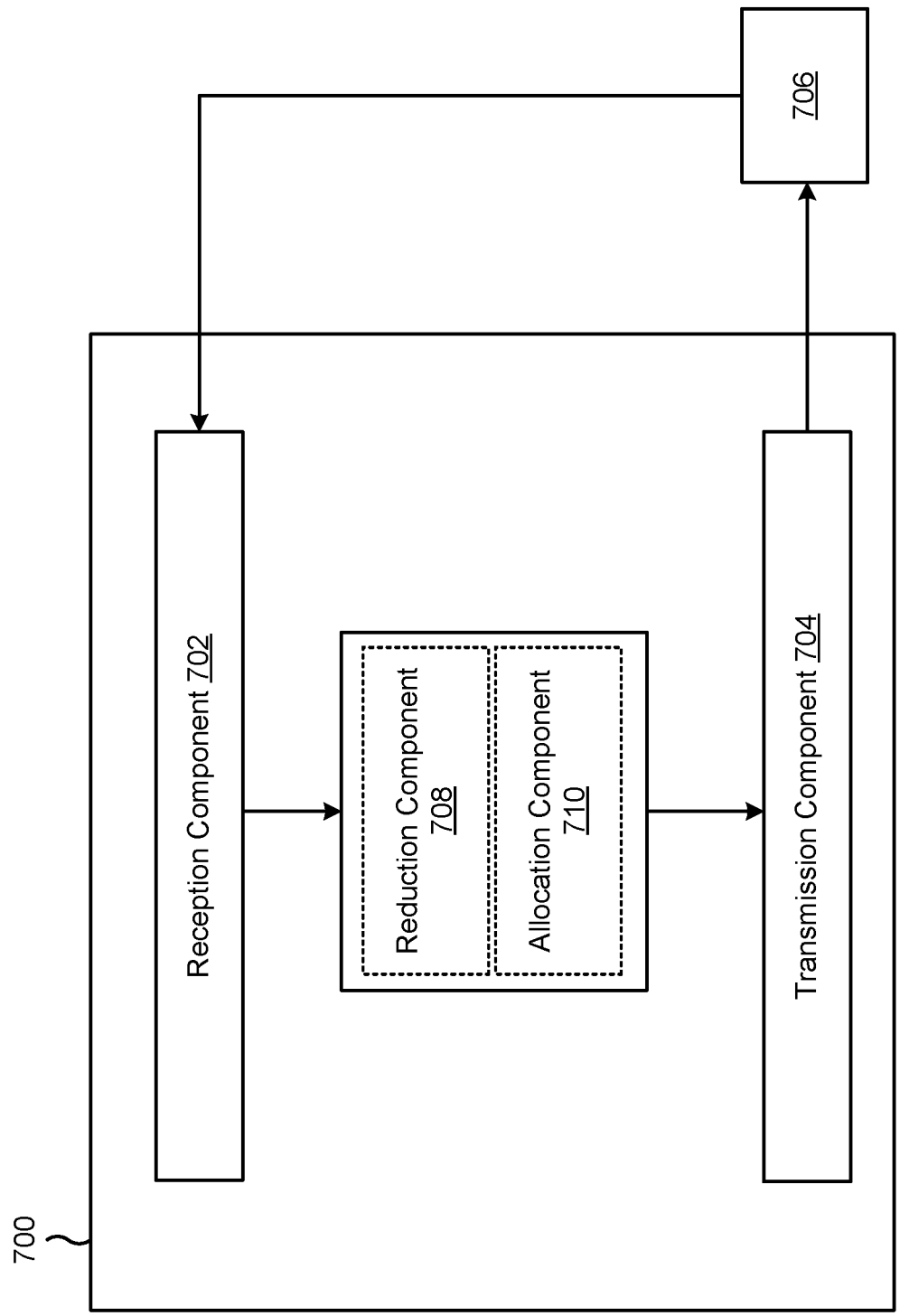
FIG. 7 is a block diagram of an example apparatus for wireless communication.

FIG. 7 is a block diagram of an example apparatus 700 for wireless communication. The apparatus 700 may be a wireless communication apparatus, or a wireless communication apparatus may include the apparatus 700. In some aspects, the apparatus 700 includes a reception component 702 and a transmission component 704, which may be in communication with one another (for example, via one or more buses or one or more other components). As shown, the apparatus 700 may communicate with another apparatus 706 (such as a UE, a base station, or another wireless communication device) using the reception component 702 and the transmission component 704. As further shown, the apparatus 700 may include one or more of a reduction component 708, or an allocation component 710, among other examples.

In some aspects, the apparatus 700 may be configured to perform one or more operations described herein in connection with FIGS. 4-5. Additionally, or alternatively, the apparatus 700 may be configured to perform one or more processes described herein, such as process 600 of FIG. 6. In some aspects, the apparatus 700 or one or more components shown in FIG. 7 may include one or more components of the wireless communication apparatus described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the wireless communication apparatus described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the wireless communication apparatus described above in connection with FIG. 2. In some aspects, the transmission component 704 may be co-located with the reception component 702 in a transceiver.

The reduction component 708 may reduce a maximum transmit power limit of a first uplink signal associated with a first RAT to obtain a first transmit power. The allocation component 710 may allocate a second transmit power remaining from the maximum transmit power limit to a second uplink signal associated with a second RAT. The transmission component 704 may transmit, to a first BS, the first uplink signal associated with the first RAT based on the first transmit power. The transmission component 704 may transmit, to a second BS, the second uplink signal associated with the second RAT based on the second transmit power. The reception component 702 may receive, from one of the first BS or the second BS, an RRC configuration that indicates the maximum transmit power limit.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method performed by a wireless communication apparatus, including: reducing a maximum transmit power limit of a first uplink signal associated with a first radio access technology (RAT) to obtain a first transmit power; allocating a second transmit power remaining from the maximum transmit power limit to a second uplink signal associated with a second RAT; transmitting, to a first base station (BS), the first uplink signal associated with the first RAT based on the first transmit power; and transmitting, to a second BS, the second uplink signal associated with the second RAT based on the second transmit power.

Aspect 2: The method of Aspect 1, where the first RAT is a Long Term Evolution RAT and the second RAT is a New Radio RAT.

Aspect 3: The method of any of Aspects 1 through 2, where the second uplink signal overlaps in time with the first uplink signal.

Aspect 4: The method of any of Aspects 1 through 3, where a total transmit power of the first uplink signal and the second uplink signal is within a tolerance level of the maximum transmit power.

Aspect 5: The method of any of Aspects 1 through 4, further including: receiving, from one of the first BS or the second BS, a radio resource control configuration (RRC) that indicates the maximum transmit power limit.

Aspect 6: The method of any of Aspects 1 through 5, where the wireless communication apparatus is located at a cell edge.

Aspect 7: The method of any of Aspects 1 through 6, where reducing the maximum transmit power limit includes reducing the maximum transmit power limit based on a condition being satisfied.

Aspect 8: The method of Aspect 7, where the condition is satisfied and the maximum transmit power limit is reduced when a path loss associated with the first RAT satisfies a threshold.

Aspect 9: The method of Aspect 7, where the condition is satisfied and the maximum transmit power limit is reduced based on one or more of an uplink modulation and coding scheme (MCS) or a modulation order associated with the first RAT.

Aspect 10: The method of Aspect 7, where the condition is satisfied and the maximum transmit power limit is reduced based on a traffic type associated with the first uplink signal.

Aspect 11: The method of Aspect 7, where the condition is not satisfied and the maximum transmit power limit is not reduced when the first uplink signal is associated with a physical random access channel (PRACH) transmission.

Aspect 12: The method of Aspect 7, where the condition is not satisfied and the maximum transmit power limit is not reduced when the first uplink signal is associated with a physical uplink control channel (PUCCH) transmission.

Aspect 13: The method of Aspect 7, where the condition is not satisfied and the maximum transmit power limit is not reduced when the first uplink signal occurs within a threshold time period after a handover of the wireless communication apparatus.

Aspect 14: The method of Aspect 7, where the condition is not satisfied and the maximum transmit power limit is not reduced when the first uplink signal occurs within a threshold time period after an initial access procedure of the wireless communication apparatus.

Aspect 15: The method of Aspect 7, where the condition is satisfied and the maximum transmit power limit is reduced based on an effective signal-to-noise ratio (SNR) level at a base station associated with the first RAT satisfying a threshold.

Aspect 16: The method of Aspect 7, where the condition is satisfied and the maximum transmit power limit is reduced based on a quantity of layers associated with a spatial multiplexing capability of the wireless communication apparatus.

Aspect 17: An apparatus for wireless communication at a device, including a processor; memory coupled with the processor; and instructions stored in the memory and executable by the processor to cause the apparatus to perform the method of one or more Aspects of Aspects 1-16.

Aspect 18: A device for wireless communication, including a memory and one or more processors coupled to the memory, the one or more processors configured to perform the method of one or more Aspects of Aspects 1-16.

Aspect 19: An apparatus for wireless communication, including at least one means for performing the method of one or more Aspects of Aspects 1-16.

Aspect 20: A non-transitory computer-readable medium storing code for wireless communication, the code including instructions executable by a processor to perform the method of one or more Aspects of Aspects 1-16.

Aspect 21: A non-transitory computer-readable medium storing a set of instructions for wireless communication, the set of instructions including one or more instructions that, when executed by one or more processors of a device, cause the device to perform the method of one or more Aspects of Aspects 1-16.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include random access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method performed by a wireless communication apparatus, comprising:
   reducing a maximum transmit power limit of a first uplink signal associated with a Long Term Evolution (LTE) radio access technology (RAT) to obtain a first transmit power,
      wherein the LTE RAT has priority on power usage over a New Radio (NR) RAT;
   allocating a second transmit power remaining from the maximum transmit power limit to a second uplink signal associated with the NR RAT;
   transmitting, to a first network entity, the first uplink signal associated with the LTE RAT based on the first transmit power; and
   transmitting, to a second network entity, the second uplink signal associated with the NR RAT based on the second transmit power.

2. The method of claim 1, wherein the second uplink signal overlaps in time with the first uplink signal.

3. The method of claim 1, wherein a total transmit power of the first uplink signal and the second uplink signal is within a tolerance level of the maximum transmit power limit.

4. The method of claim 1, further comprising:
receiving, from one of the first network entity or the second network entity, a radio resource control (RRC) configuration that indicates the maximum transmit power limit.

5. The method of claim 1, wherein the wireless communication apparatus is located at a cell edge.

6. The method of claim 1, wherein reducing the maximum transmit power limit comprises reducing the maximum transmit power limit based on a condition being satisfied.

7. The method of claim 6, wherein the condition is satisfied and the maximum transmit power limit is reduced when a path loss associated with the LTE RAT satisfies a threshold.

8. The method of claim 6, wherein the condition is satisfied and the maximum transmit power limit is reduced based on one or more of an uplink modulation and coding scheme (MCS) or a modulation order associated with the LTE RAT.

9. The method of claim 6, wherein the condition is satisfied and the maximum transmit power limit is reduced based on a traffic type associated with the first uplink signal.

10. The method of claim 6, wherein the condition is not satisfied and the maximum transmit power limit is not reduced when the first uplink signal is associated with a physical random access channel (PRACH) transmission or a physical uplink control channel (PUCCH) transmission.

11. The method of claim 6, wherein the condition is not satisfied and the maximum transmit power limit is not reduced when the first uplink signal occurs within a threshold time period after a handover of the wireless communication apparatus.

12. The method of claim 6, wherein the condition is not satisfied and the maximum transmit power limit is not reduced when the first uplink signal occurs within a threshold time period after an initial access procedure of the wireless communication apparatus.

13. The method of claim 6, wherein the condition is satisfied and the maximum transmit power limit is reduced based on an effective signal-to-noise ratio (SNR) level at a network entity associated with the LTE RAT satisfying a threshold.

14. The method of claim 6, wherein the condition is satisfied and the maximum transmit power limit is reduced based on a quantity of layers associated with a spatial multiplexing capability of the wireless communication apparatus.

15. A wireless communication apparatus, comprising:
a processing system configured to:
reduce a maximum transmit power limit of a first uplink signal associated with a Long Term Evolution (LTE) radio access technology (RAT) to obtain a first transmit power,
wherein the LTE RAT has priority on power usage over a New Radio (NR) RAT; and
allocate a second transmit power remaining from the maximum transmit power limit to a second uplink signal associated with the NR RAT; and
a first interface configured to:
output, to a first network entity, the first uplink signal associated with the first LTE RAT based on the first transmit power; and
output, to a second network entity, the second uplink signal associated with the NR RAT based on the second transmit power.

16. The wireless communication apparatus of claim 15, wherein the second uplink signal overlaps in time with the first uplink signal.

17. The wireless communication apparatus of claim 15, wherein a total transmit power of the first uplink signal and the second uplink signal is within a tolerance level of the maximum transmit power limit.

18. The wireless communication apparatus of claim 15, wherein the first interface or a second interface is further configured to:
obtain, from one of the first network entity or the second network entity, a radio resource control (RRC) configuration that indicates the maximum transmit power limit.

19. The wireless communication apparatus of claim 15, wherein the wireless communication apparatus is located at a cell edge.

20. The wireless communication apparatus of claim 15, wherein the processing system, to reduce the maximum transmit power limit, is configured to reduce the maximum transmit power limit based on a condition being satisfied.

21. The wireless communication apparatus of claim 15, wherein the processing system, to reduce the maximum transmit power limit, is configured to:
determine that a condition is satisfied; and
reduce the maximum transmit power limit when a path loss associated with the LTE RAT satisfies a threshold.

22. The wireless communication apparatus of claim 15, wherein the processing system, to reduce the maximum transmit power limit, is configured to:
determine that a condition is satisfied; and
reduce the maximum transmit power limit based on one or more of an uplink modulation and coding scheme (MCS) or a modulation order associated with the LTE RAT.

23. The wireless communication apparatus of claim 15, wherein the processing system, to reduce the maximum transmit power limit, is configured to:
determine that a condition is satisfied; and
reduce the maximum transmit power limit based on a traffic type associated with the first uplink signal.

24. The wireless communication apparatus of claim 20, wherein the condition is not satisfied and the maximum transmit power limit is not reduced when the first uplink signal is associated with a physical random access channel (PRACH) transmission or a physical uplink control channel (PUCCH) transmission.

25. The wireless communication apparatus of claim 20, wherein the condition is not satisfied and the maximum transmit power limit is not reduced when the first uplink signal occurs within a threshold time period after a handover of the wireless communication apparatus.

26. The wireless communication apparatus of claim 20, wherein the condition is not satisfied and the maximum transmit power limit is not reduced when the first uplink signal occurs within a threshold time period after an initial access procedure of the wireless communication apparatus.

27. The wireless communication apparatus of claim 15, wherein the processing system, to reduce the maximum transmit power limit, is configured to:
determine that a condition is satisfied; and reduce the maximum transmit power limit based on an effective signal-to-noise ratio (SNR) level at a network entity associated with the LTE RAT satisfying a threshold.

28. The wireless communication apparatus of claim 15, wherein the processing system, to reduce the maximum transmit power limit, is configured to:
 determine that a condition is satisfied; and
 reduce the maximum transmit power limit based on a quantity of layers associated with a spatial multiplexing capability of the wireless communication apparatus.

29. The method of claim 1, wherein reducing the maximum transmit power limit of the first uplink signal associated with the LTE RAT to obtain the transmit power comprises:
 reducing the maximum transmit power limit of the first uplink signal associated with the LTE RAT from 23 decibel-milliwatts (dBm) to 21.5 dBm.

30. The wireless communication apparatus of claim 15, wherein the maximum transmit power limit is 23 decibel-milliwatts (dBm) and the transmit power is 21.5 dBm.

\* \* \* \* \*